(12) United States Patent
Jindal et al.

(10) Patent No.: US 7,971,137 B2
(45) Date of Patent: Jun. 28, 2011

(54) DETECTING AND REJECTING ANNOYING DOCUMENTS

(75) Inventors: Deepak Jindal, Sunnyvale, CA (US); Anurag Agarwal, Austin, TX (US)

(73) Assignee: Google Inc., Mountain View, CA (US)

( * ) Notice: Subject to any disclaimer, the term of this patent is extended or adjusted under 35 U.S.C. 154(b) by 1169 days.

(21) Appl. No.: 11/302,495

(22) Filed: Dec. 14, 2005

(65) Prior Publication Data

US 2007/0133034 A1    Jun. 14, 2007

(51) Int. Cl.
*G06F 17/24* (2006.01)
*G06F 17/27* (2006.01)
*G06F 17/28* (2006.01)

(52) U.S. Cl. .................. 715/234; 715/272; 715/277

(58) Field of Classification Search .......... 707/100; 715/234, 272, 277
See application file for complete search history.

(56) References Cited

U.S. PATENT DOCUMENTS

| | | | |
|---|---|---|---|
| 4,430,831 A | 2/1984 | Kemp | |
| 5,169,544 A | 12/1992 | Stanfill et al. | |
| 5,636,346 A | 6/1997 | Saxe | |
| 5,724,521 A * | 3/1998 | Dedrick | 705/26 |
| 5,787,660 A | 8/1998 | Adams | |
| 5,799,453 A | 9/1998 | Westerlund | |
| 5,845,265 A | 12/1998 | Woolston | |
| 5,918,010 A | 6/1999 | Appleman et al. | |
| 5,920,854 A * | 7/1999 | Kirsch et al. | 707/3 |
| 5,931,901 A | 8/1999 | Wolfe et al. | |
| 5,974,398 A | 10/1999 | Hanson et al. | |
| 5,974,412 A * | 10/1999 | Hazlehurst et al. | 707/3 |
| 5,996,293 A | 12/1999 | Anderson et al. | |
| 6,026,368 A | 2/2000 | Brown et al. | |
| 6,044,375 A * | 3/2000 | Shmueli et al. | 707/101 |
| 6,061,659 A * | 5/2000 | Murray | 705/14 |
| 6,067,570 A | 5/2000 | Kreynin et al. | |
| 6,078,866 A | 6/2000 | Buck et al. | |
| 6,223,163 B1 | 4/2001 | Van Luchene | |
| 6,247,009 B1 * | 6/2001 | Shiiyama et al. | 707/3 |
| 6,253,189 B1 | 6/2001 | Feezell et al. | |
| 6,269,361 B1 | 7/2001 | Davis et al. | |
| 6,285,987 B1 | 9/2001 | Roth et al. | |
| 6,285,999 B1 | 9/2001 | Page | |
| 6,289,353 B1 * | 9/2001 | Hazlehurst et al. | 707/102 |
| 6,298,348 B1 | 10/2001 | Eldering | |

(Continued)

FOREIGN PATENT DOCUMENTS

EP    1026610    8/2000

(Continued)

OTHER PUBLICATIONS

Brin, S. and Page, L. "The Anatomy of a Large-Scale Hypertextual Web Search Engine". Copyright Date 1998.*

(Continued)

*Primary Examiner* — Doug Hutton
*Assistant Examiner* — Soumya Dasgupta
(74) *Attorney, Agent, or Firm* — Fish & Richardson P.C.

(57) ABSTRACT

A system and method for evaluating documents for approval or rejection and/or rating. The method comprises comparing the document to one or more criteria determining whether the document contains an element that is substantially identical to one or more of a visual element, an audio element or a textual element that is determined to be displeasing.

20 Claims, 10 Drawing Sheets

U.S. PATENT DOCUMENTS

| | | | |
|---|---|---|---|
| 6,324,519 B1 | 11/2001 | Eldering | |
| 6,336,132 B2 | 1/2002 | Appleman et al. | |
| 6,421,675 B1 | 7/2002 | Ryan et al. | |
| 6,505,195 B1* | 1/2003 | Ikeda et al. | 707/3 |
| 6,711,570 B1* | 3/2004 | Goldberg et al. | 707/6 |
| 7,136,875 B2 | 11/2006 | Anderson et al. | |
| 7,185,001 B1* | 2/2007 | Burdick et al. | 1/1 |
| 7,275,052 B2* | 9/2007 | Peh | 707/2 |
| 7,536,408 B2* | 5/2009 | Patterson | 707/100 |
| 7,639,898 B1* | 12/2009 | Chan | 382/305 |
| 7,668,748 B1 | 2/2010 | Veach | |
| 7,697,791 B1 | 4/2010 | Chan et al. | |
| 7,778,872 B2 | 8/2010 | Kamangar et al. | |
| 7,792,698 B1 | 9/2010 | Veach et al. | |
| 7,801,738 B2 | 9/2010 | Agarwal et al. | |
| 7,818,207 B1 | 10/2010 | Veach | |
| 7,844,493 B1 | 11/2010 | Veach et al. | |
| 2001/0042064 A1 | 11/2001 | Davis et al. | |
| 2001/0047297 A1 | 11/2001 | Wen | |
| 2001/0051911 A1 | 12/2001 | Marks et al. | |
| 2002/0002509 A1 | 1/2002 | Wagorn et al. | |
| 2002/0002525 A1 | 1/2002 | Arai et al. | |
| 2002/0026359 A1 | 2/2002 | Long et al. | |
| 2002/0035536 A1 | 3/2002 | Gellman | |
| 2002/0038282 A1 | 3/2002 | Montgomery | |
| 2002/0046099 A1 | 4/2002 | Frengut et al. | |
| 2002/0046104 A1 | 4/2002 | Kaddeche et al. | |
| 2002/0059588 A1* | 5/2002 | Huber et al. | 725/35 |
| 2002/0077891 A1 | 6/2002 | Castle et al. | |
| 2002/0099605 A1 | 7/2002 | Weitzman et al. | |
| 2002/0111898 A1 | 8/2002 | Numaoka et al. | |
| 2002/0123988 A1* | 9/2002 | Dean et al. | 707/3 |
| 2002/0165773 A1 | 11/2002 | Natsuno et al. | |
| 2002/0184097 A1 | 12/2002 | Hijiri et al. | |
| 2002/0194062 A1 | 12/2002 | Linde | |
| 2002/0194161 A1* | 12/2002 | McNamee et al. | 707/2 |
| 2002/0198780 A1 | 12/2002 | Kawakami et al. | |
| 2003/0009495 A1* | 1/2003 | Adjaoute | 707/501.1 |
| 2003/0037334 A1 | 2/2003 | Khoo et al. | |
| 2003/0070167 A1 | 4/2003 | Holtz et al. | |
| 2003/0083937 A1 | 5/2003 | Hasegawa et al. | |
| 2003/0088680 A1* | 5/2003 | Nachenberg et al. | 709/229 |
| 2003/0149618 A1* | 8/2003 | Sender et al. | 705/14 |
| 2003/0163372 A1 | 8/2003 | Kolsy | |
| 2003/0216963 A1 | 11/2003 | Ishiwaka et al. | |
| 2004/0015397 A1 | 1/2004 | Barry et al. | |
| 2004/0019523 A1* | 1/2004 | Barry et al. | 705/14 |
| 2004/0044571 A1 | 3/2004 | Bronnimann et al. | |
| 2004/0054577 A1 | 3/2004 | Inoue et al. | |
| 2004/0054589 A1 | 3/2004 | Nicholas et al. | |
| 2004/0059708 A1* | 3/2004 | Dean et al. | 707/1 |
| 2004/0059712 A1 | 3/2004 | Dean et al. | |
| 2004/0093327 A1* | 5/2004 | Anderson et al. | 707/3 |
| 2004/0093620 A1 | 5/2004 | Iino et al. | |
| 2004/0119740 A1 | 6/2004 | Chang et al. | |
| 2004/0143499 A1 | 7/2004 | Dietsch et al. | |
| 2004/0143843 A1 | 7/2004 | Khoo et al. | |
| 2004/0167928 A1* | 8/2004 | Anderson et al. | 707/104.1 |
| 2004/0249709 A1 | 12/2004 | Donovan et al. | |
| 2004/0268211 A1* | 12/2004 | Huff | 715/500 |
| 2005/0033849 A1* | 2/2005 | Matz | 709/228 |
| 2005/0065806 A1 | 3/2005 | Harik | |
| 2005/0071224 A1 | 3/2005 | Fikes et al. | |
| 2005/0071741 A1* | 3/2005 | Acharya et al. | 715/500 |
| 2005/0076014 A1 | 4/2005 | Agarwal et al. | |
| 2005/0096979 A1 | 5/2005 | Koningstein | |
| 2005/0108659 A1* | 5/2005 | Philyaw | 715/862 |
| 2005/0131758 A1 | 6/2005 | Desikan et al. | |
| 2005/0131762 A1 | 6/2005 | Bharat et al. | |
| 2005/0144069 A1* | 6/2005 | Wiseman et al. | 705/14 |
| 2005/0216335 A1 | 9/2005 | Fikes et al. | |
| 2005/0222900 A1 | 10/2005 | Fuloria et al. | |
| 2005/0222903 A1 | 10/2005 | Buchheit et al. | |
| 2005/0222989 A1 | 10/2005 | Haveliwala et al. | |
| 2005/0223002 A1* | 10/2005 | Agarwal et al. | 707/7 |
| 2005/0244744 A1* | 11/2005 | Kazmaier et al. | 430/270.1 |
| 2005/0251732 A1 | 11/2005 | Lamkin et al. | |
| 2005/0261062 A1* | 11/2005 | Lewin et al. | 463/42 |
| 2005/0262089 A1* | 11/2005 | Wu | 707/10 |
| 2006/0005148 A1* | 1/2006 | Cheng et al. | 715/808 |
| 2006/0005247 A1* | 1/2006 | Zhang et al. | 726/26 |
| 2006/0020571 A1* | 1/2006 | Patterson | 707/1 |
| 2006/0020607 A1* | 1/2006 | Patterson | 707/100 |
| 2006/0031195 A1* | 2/2006 | Patterson | 707/3 |
| 2006/0294155 A1* | 12/2006 | Patterson | 707/200 |
| 2010/0070510 A1 | 3/2010 | Agarwal et al. | |
| 2010/0198825 A1 | 8/2010 | Chan et al. | |

FOREIGN PATENT DOCUMENTS

| | | |
|---|---|---|
| WO | 0038074 | 6/2000 |
| WO | 2004042525 | 5/2004 |

OTHER PUBLICATIONS

Google Introduces New Pricing for Popular Self-Service Online Advertsing Program, http://www.google.com/press/pressrel/select.html, p. 1-2, dated Feb. 20, 2002, printed on Jul. 29, 2003.

Collection of pages from www.overture.com, printed on Jul. 29, 2003.

Collection of pages from findwhat.com, http://www.findwhat.com, printed on Jul. 29, 2003.

Collection of pages from Sprinks.com, http://www.sprinks.com, printed on Jul. 29, 2003.

Collection of pages from Kandoodle.com, http://www.kanoodle.com, printed on Jul. 29, 2003.

Collection of pages from Google Advertising, http://www.google.com, printed on Jul. 29, 2003.

Chris Sherman, "Google Launches AdWords Select," Feb. 20, 2002, 6 pages.

* cited by examiner

DETECTING AND REJECTING ANNOYING DOCUMENTS

FIELD OF THE INVENTION

The present inventions relate generally to detecting undesirable characteristics of a document such as an advertisement and rejecting such document for distribution.

BACKGROUND OF THE INVENTION

The Internet provides a useful venue for advertising. However, Internet advertisements may contain characteristics that are often found annoying or otherwise displeasing to persons who view the ads. For instance, ads may contain offensive language or annoying actions such as flashing or strobing or be of poor image quality. It is desirable for entities who have some control over whether to allow an ad to be displayed on the Internet to be able to detect annoying or otherwise displeasing ads.

One method of detecting ads which are annoying or otherwise displeasing is to manually review the ad before distributing it to the audience. However, there are problems associated with manual review. For example, one significant drawback of manual review systems and methods is the time and expense involved in reviewing the ads.

These and other drawbacks exist with current systems and methods.

SUMMARY OF THE INVENTION

Accordingly, various embodiments of the present inventions may be directed a system and method for evaluating documents for approval or rejection and/or rating. The method comprises comparing the document to one or more criteria determining whether the document contains an element that is substantially identical to one or more of a visual element, an audio element or a textual element that is determined to be displeasing. An approval determination may be made for the document based on the stored information about the at least one parameter and the comparison.

In another exemplary embodiment, a method for approving or rejecting a document is provided. A document is processed for distribution. The document is compared to at least one parameter and a determination is made as to whether the document contains an element that is substantially identical to one or more of a visual element, an audio element or a textual element that is determined to be displeasing. Based on the act of comparing, the document is either approved or rejected for distribution.

DETAILED DESCRIPTION OF EXEMPLARY EMBODIMENT(S)

The embodiments described herein solve many problems with existing systems and methods. One problem facing Internet content providers is evaluating a large number of documents (such as advertisements presented through its services) to determine whether each is annoying or otherwise displeasing for a wide variety of different users. Embodiments described herein overcome these and other problems by processing a document to determine whether the document is annoying or otherwise displeasing by identifying annoying or displeasing parameters and comparing the document to the parameters (e.g., offensive language or flashing action). The processing may occur automatically, i.e., by a machine-implemented process and/or without human input or intervention.

The embodiments described herein enable Flash and animated image documents (e.g., advertisements). Some of these types of ads are annoying. An embodiment of the present invention provides for uploading a document such as an advertisement and comparing the document to specified parameters. The document can be compared to the parameters by a document processor (e.g., automatically by an image processor). The processor may process images, sound files, and other data to identify text, images (as well as spoken words and other data), and actions in the ad. For instance, text may be identified in an image using optical character recognition (OCR) technology. By comparing the document to specified parameters, characteristics can be identified in and associated with the document, and the document can be accordingly rated and approved or rejected based on these characteristics and the status of the ratings of the comparison parameters.

While the term "advertisement" and "ad" may be used as an illustrative example, it should be appreciated that the same system and method may be applied to other forms of documents or electronic documents. As used herein, the term "document" and "electronic document" may encompass one or more advertisements, content pages (e.g., web pages), search results, emails, applications, IM messages, audio content or files, video content or files, other files, other data or applications that may reside on one or several (e.g., a network) of computer systems, or other definable concepts or content.

Overview and System Architecture

Figure 1:
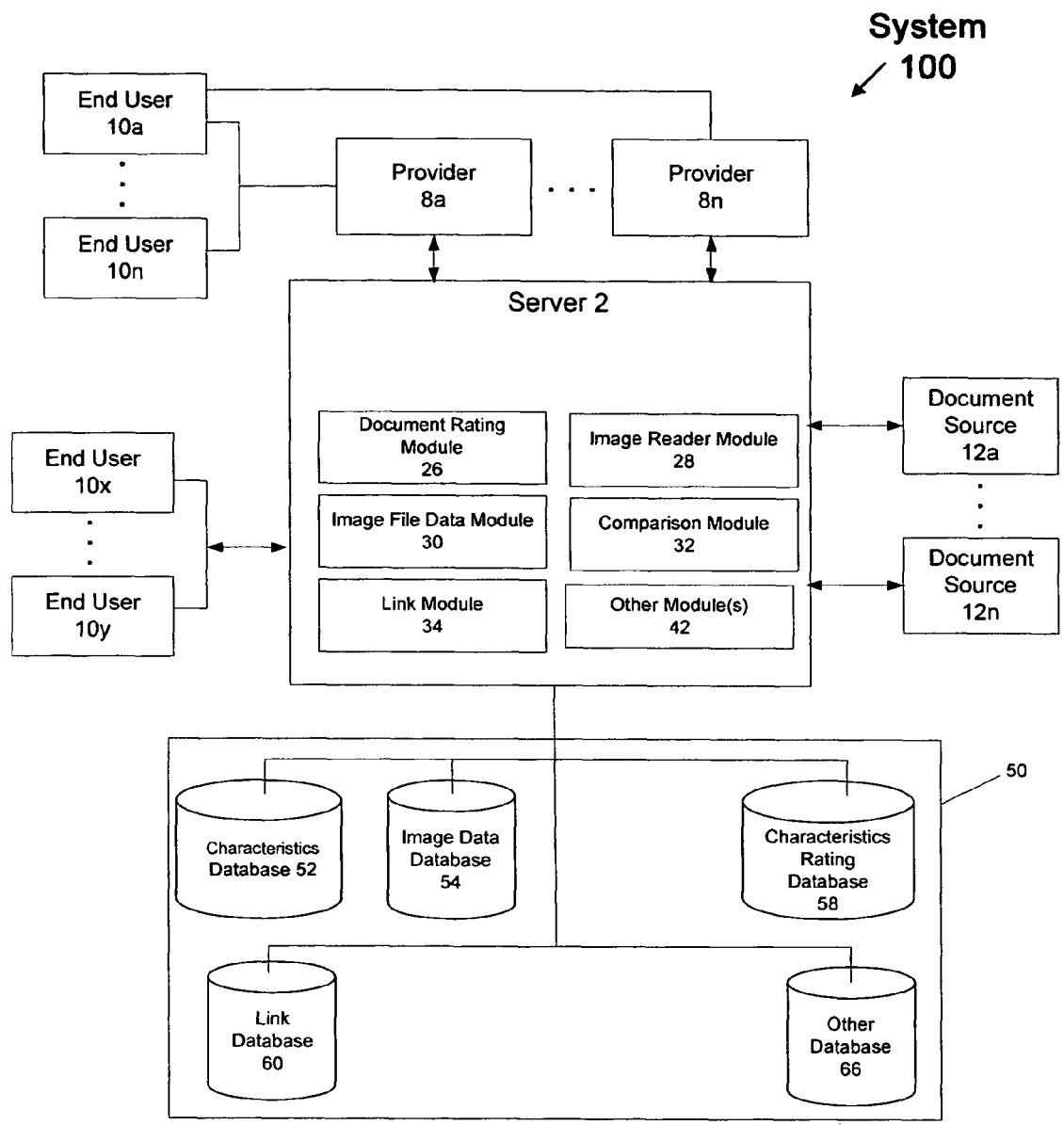
FIG. 1 depicts a system for approving or rejecting an electronic document according to an embodiment of the invention.

FIG. 1 depicts a system 100 for approving or rejecting an electronic document based on characteristics of the electronic document according to an embodiment of the invention. The system may comprise: a server 2, one or more providers 8, one or more document sources 12, one or more end users 10, and one or more databases 50 operatively connected to server 2.

System 100 may enable server 2 to process characteristics ratings of electronic documents. Document sources 12, providers 8, and end users 10 may communicate with one or more servers 2 via electronic communication, including Internet communications. Document sources 12, providers 8, and end users 10 may include or have access to one or more servers 2 for providing functionality associated with electronic documents.

Information that may be communicated between and among server 2, providers 8, document sources 12, and end users 10 may include one or more of the following: document information, document performance information, document characteristics rating information, sensitivity rating information, suitability standard information, trust score information, provider information, link information, and other information. The document information may include one or more of the following: the document itself, any language(s) used in the document, length information, information regarding the type(s) of files in the document (e.g., html, doc, zip, etc.), type of document (advertisement, educational document), summary information, audio content (e.g., song lyrics), visual content (e.g., pictures of faces), pornographic content, other offensiveness content (e.g., use of potentially offensive words), programming code, image quality, actions associated with the document, age-related content, the identity of the document owner and/or the document creator, information about the document's intended audience (such as geographic area, age range, gender, race, national origin, religion, other demographic information), and any other information related to a document or to the server 2, providers 8, or document sources 12.

Document sources 12 may provide documents to server 2, or server 2 may "pull" or retrieve documents from document sources 12. For instance, the document source 12 may provide an advertisement to server 2 so that the server 2 may then provide the advertisement to one or more content providers 8, and the providers 8 may provide the ad to one or more end users 10 (or server 2 may provide the ad directly to the end user 10). Document sources 12 may include any content creator or content provider 8, such as an advertisement listings provider or server 2.

Providers 8 may provide documents to one or more end-users, 10a through 10n. Providers 8 may include a content provider, search engine or other entity that makes available information, services, and/or products over an electronic network, such as the Internet. A provider 8 may include one or more of the following, for example: an advertisement listings provider, an electronic document provider, a website host, a server 2, any other entity that provides electronic documents to users or other entities, or any other provider of content.

The providers 8 may be partners of an entity associated with operating server 2. An end user 10 may be one or more persons, computers, computer networks, or other entity on a network. An end user 10 may request and receive content from a provider 8 and/or server 2. Additional participants may be included based on various applications.

The server 2 may comprise any server 2, hub, central processor, provider, search engine, or other entity in a network. A database 50 coupled to the server 2 may include one or more databases 50-66. Also, databases 50-66 may comprise portions of a single database 50. It should be appreciated that the databases 50-66 may or may not be physically distinct. The server 2 and its modules 20-42 may store and access information stored in the database(s) 50-66.

A characteristics database 52 may store documents and/or data related to the documents, such as portions, images, actions, text, and hardware, patterns, rules, and programming usable by the document.

The documents may be received from document sources 12 and/or providers 8. The server 2 may also generate documents. The documents may be rated and/or unrated. For example, the documents may or may not have rating information of a specific type associated with them. For instance, the documents may have rating information from modules 28, 30, but not from an end user 10 or provider 12.

The characteristics database 52 may identify documents of a certain type. For instance, documents may be identified according to one or more of the following features: subject matter, characteristics rating, aggregate characteristics rating, sensitivity score, characteristics type, language, geographic origin (e.g., country or city of origin), geographic area of target audience, document source 12, owner of content, creator of content, target demographic, actions (such as image flashing), image movement, hardware usable by the document (such as a mouse, game controllers, camera, or microphone), whether user interaction is provided by the document (which may indicate a game), whether the document's programming involves random number generation, or other criteria. For instance, the documents may be identified according to their offensiveness/appropriateness characteristics, associated keywords, associated site (e.g., a site explicitly or implicitly linked from the document, such as through an embedded hypertext link), status of associated site (e.g., whether a link in a document is broken and/or points to an invalid URL), flesh content (e.g., state of undress of human images), pornographic or other prurient content, adult content, drug- or alcohol-related content, children's content. The documents may also contain annoying actions such as flashing, strobing, repetitive movement, infinitely looping animation, use of streaming video and/or audio, open network connections, involve game playing, or other actions which the provider may wish to use for criteria for approving or rejecting a document. The documents may also be identified by poor image quality or other criteria.

An image data database 54 may store image data. The image data may be received from a document source 12, the image reader module 28, and the image file data module 30. For instance, the image reader module 28 may read image data and store it in the image data database 54.

The image data database 54 may also store a wide variety of images and data used by Optical Character Recognition ("OCR") (e.g., OCR processors and/or software) and other image processors to process and identify text and images. For instance, the image data database 54 may store programs and files that define and describe various images and image types. The programs may also identify patterns in the document that can be used to compare the document to other documents (e.g., by comparing the patterns in one document to the patterns in another). The image data database 54 may store generic (and specific) images for comparison. For instance, the image data database 54 may store a generic image of an apple. The comparison module 32 may process an image of a fruit and compare it to the stored image of the apple to determine whether the two images are sufficiently similar and accordingly determine whether the image can be classified as an image of an apple.

A characteristics rating database 58 may store characteristics ratings (i.e., "rating information") and other information generated by the image data module 28, as well as any other information that may be relevant to rating a document. For instance, the characteristics rating database 58 may store information relating to whether the document involves flashing or strobing images, repetitive movement, infinitely looping animation, use of streaming video and/or audio, open network connections, involve game playing, or other annoying or otherwise displeasing actions. Each stored characteristics rating may be associated with a particular document (e.g., an electronic document).

Each characteristics rating may comprise one or more subject ratings.

Each characteristics rating may also comprise one or more action ratings. For instance, a characteristics rating may include a rating for flashing, strobing, linking to other documents (e.g., links to a URL), program code looping, connecting to streaming audio or video, or connecting to hardware devices such as a mouse or game controller.

Each characteristics rating may also comprise one or more image quality ratings. For instance, a characteristics rating may include a rating for quality related to image sizing, bordering, definition, shading, or perspective.

These separate ratings may or may not be combined into a single score (e.g., a single aggregate rating for a document). A document's characteristics rating and/or aggregate rating may change as new rating information for the document is received.

The characteristics rating database 58 may also store a general approval status of a document. The approval status may be "approved," "disapproved," "suspended pending further review," or "rejected," for instance. A document may have an approval status for a variety of criteria.

A link database 60 may store linked documents and the links themselves. For instance, the server may receive an image ad from a document source 12a. The image ad may have an embedded hypertext link (e.g., http://www.website.com/about/index) as well as a different link displayed in the image (e.g., www.website.com). The link database 60 may store the two links; link database 60 may also store the linked documents, e.g., an image or html file of the websites located at the linked addresses. The link database 60 may also store other link-related information.

Other database(s) 66 may store other information related to the documents, links, linked documents, and other information.

The server 2 may comprise one or more modules to process documents and content, document ratings and other entity ratings, trust scores (e.g., of document sources), and other data. The modules of server 2 may store, access and otherwise interact with various sources of data, including external data, databases and other inputs.

The document rating module 26 may also process rating information related to the actions performed by the document, such as flashing, strobing, linking to other documents (e.g., links to a URL), program code looping, downloading of streaming audio or video documents, or connecting to hardware devices such as a mouse or game controller. The document rating module 26 accomplishes such processing by checking the document program code for objects, commands, and other code that generate such action.

For instance, a document program code that involves mouse motion tracking would involve user interaction and likely involve game playing and as such may be considered by the Provider 8 to be an annoying or otherwise displeasing characteristic of an ad. Similarly, program code that involves random number generation likely would involve game playing and could be assigned an appropriate action rating. Program code that results in audio or video action without being initiated by the user may be considered by the Provider 8 to be an annoying or otherwise displeasing characteristic of an ad and could be assigned an appropriate action rating.

The document rating module 26 may also check for actions such as flashing, flickering, or jiggling. Flash multimedia authoring program ("Flash") may have been used to create document and is based on vector graphics and hence represents a frame as a collection of objects instead of a bitmap. A SWF file is made up of a header followed by a sequence of tags. There are two basic types of tags: Definition tags and Control tags. Definition tags define the objects which are then manipulated by the control tags to form the animation. The Flash player processes the tags until it encounters a ShowFrame tag. At that point, all the objects placed on the display list are shown on the screen. The player then continues to process the new control tags until it encounters the next ShowFrame tag. This way an animation is rendered on the screen. Flash also has support for a scripting language called ActionScript which has support for expression evaluation, branching, looping and Javascript-style object model along with inheritance. ActionScript also has built-in support for streaming audio and video along with some network connection capability.

Some of the tags in a SWF file have a ActionScript block which is executed either on some event or when the element is displayed. A block of code generally begins with a constant pool which contains the set of strings used in the ActionScript code. These strings can be string constants, variable names or class names. An instruction takes some arguments from the stack and pushes the result back on the stack. For example, a Date object creation in ActionScript looks like:
myDate = new Date( );
After compilation, it would appear as the following set of instructions:
action: Constantpool String: "myDate", String: "Date" action: Push Lookup:0 Lookup:1 action:
NewObject action: SetVariable The Push operation pushes the two strings in the order specified onto the stack. The NewObject command pops one argument from the stack and uses it to instantiate an object of that type. The resulting object is then pushed back on the stack. SetVariable pops two values from the stack and uses them as the RHS and LHS of an assignment statement i.e it assigns the first value on the stack to the second value (a variable) on the stack.

In order to track the click-through-rate for an ad, the system evaluates the target URL for a click at the time when the ad is displayed. For Flash, this may be accomplished by passing the target URL by setting a variable, generally named as "clickTAG." An ad may ensure that on a click, it reads the URL from the clickTAG variable and directs the user to that URL. The system may elect to only accept Flash ads that support clickTAG.

GIF may have been used to create documents being assessed for annoyance detection and/or rating and/or approval or rejection. The GIF format supports transparency through matte channel. Matte value of a pixel specifies if it is transparent or not. Every frame in a GIF animation has a page offset which specifies the position at which the frame is displayed with respect to the animation. The transparency option along with page offset and disposal method is often used to create optimized animations. The disposal method specifies the action to be performed on the previous frame before the next frame is displayed. It supports four options:

1. Unspecified: Replace the old frame
2. Do Not Dispose: Keep the old frame

3. Restore to Background: Restore the frame to background. Here background is the special background layer that is specified to GIF.
4. Restore to Previous: Restore the frame to the state before the old frame Every frame in a GIF animation includes a delay parameter which specifies the display duration for that frame in 1/100 second units. A NETSCAPE extension also allows specification of number of iterations that an animation should make.

Flashing and jiggling ads generally have small delay parameters so the document rating module 26 may check for delay parameters that have been quantified by the Provider 8 to be considered small. Flashing or flickering ads generally consist of frames which change contrast and color scheme at a rapid rate. Therefore, the document rating module 26 may check for the same content in different frames and significant (as quantified by the Provider 8 by a designated comparison rate) intensity of color changes between different frames. Jiggling ads generally are images with every frame containing the same object but at slightly different positions. Therefore, the document rating module 26 may do a pixel-by-pixel match to determine if the frames are simply translations of a single image. To detect jiggling ads, the document rating module 26 may also match images by aligning the borders of the object contained in the image or by computing motion vectors and checking whether a group of the vectors are directed to the same direction. The document rating module 26 may also compute the Fast Fourier Transform for all the frames of an image and take the sum of the absolute difference of the coefficients. The closer that this difference is to zero, the more likely the image is jiggling. If this difference computes to within a quantified parameter specified by the Provider 8, the ad may be considered to be jiggling and assigned an appropriate rating.

The document rating module 26 may also check for image quality and layout problems by comparing quality characteristics of the document with previously established quality parameters. For layout problems, the document rating module 26 may extract the border from the image and check whether the border has a sharp edge boundary or occupies a large part of the image, which would be considered undesirable and result in an appropriate rating or ratings being assigned to the document. For image quality, the document may be evaluated based upon image quality metrics (IQMs) chosen by the Provider 8 and the document would be assigned an appropriate rating or ratings.

The image reader module 28 may comprise one or more computers or data processors equipped with one or more optical sensors. An image file data module 30 may process image data, such as data received from the image reader module 28. The image reader module 28 and image file data module 30 may be used in the processing, including rating, of optical data, such as images, text, and links, from the image of the document. This process is explained in further detail in U.S. patent application Ser. No. 10/841,833 (now U.S. Pat. No. 7,639,898) entitled "Method and System for Approving Documents Based on Image Similarity" filed May 10, 2004. This application is incorporated herein by reference in its entirety.

The image file data module 30 may identify one or more images in a document based on the optical and/or computer file data processed by the image reader module 28. In other words, the module 30 may recognize text, characters, and/or images. Based on this information, the image reader module 28 may rate the document (e.g., image) along these and other criteria.

An advantage of using the modules 26, 28, 30 to determine rating information is that rating information can be automatically determined (i.e., without human intervention). Because the server 2 may receive and distribute thousands, millions, and/or billions of different documents, the transaction and administrative costs of manually reviewing each document may be prohibitive and/or expensive. The modules 26, 28, 30 may provide a sufficient preliminary review of an image or other document to determine whether a document is approved (e.g., acceptable and appropriate) for general distribution or for distribution to one or more specific providers 8 or end users 10.

It should be understood that a single document may have one or more electronic embodiments and one or more physical embodiments. For instance, a single document may take the forms of a .pdf file, a .gif file, a .tiff file, a file of another format, a printed piece of paper, a photograph, another physical object, or a visual display on a screen or monitor. Thus, a single document may be passed from the server 2 to the rating entities (such as the image reader module 28 and image file data module 30) in an electronic format (e.g., .pdf format) or a physical embodiment (e.g., a printed document on a piece of paper).

It should be further understood that the image reader module 28 and image file data module 30 may also be configured to process and identify concepts based on sounds, animations, video, pop-up ability, and other audio-visual information. Accordingly, the modules 28, 30 may further comprise speakers, microphones, and audio/video processors. For instance, the modules 28, 30 may comprise voice recognition technology to process sound files to determine words spoken or sung in a sound file. The modules 28, 30 may further be configured to recognize types of sounds, like the sound of the ocean, the sound of jazz music, and the sound of an orchestra. Based on audio (and other audio-visual) information, additional concepts may be associated with a document.

A comparison module 32 may compare the image (or portions thereof) or file content to other images (or portions thereof) or files, e.g., images or portions stored in the characteristics database 52 and image data database 54. Specifically, the comparison module 32 may compare an image from one document source 12a to one or more documents from the same document source 12a already stored in the content database 52 or image data database 54. For instance, the comparison module 32 may determine whether a document is identical to (or substantially identical to) another document. The document comparison module 32 may also determine a degree of similarity between two or more documents (e.g., that a document is 80% similar to another document).

The comparison module 32 may also identify that a first document has similar offensive, inappropriate content or annoying elements as a second document, file or image. For instance, if the module 32 identifies that an image ad contains an image that is substantially identical to an inappropriate image of Janet Jackson in a web page that was determined to be pornographic, the module 32 may flag the image ad for review or otherwise indicate that the image ad may have inappropriate content. For instance, the module 32 may send negative rating information to the document rating module 26, and the document rating module 26 may flag the ad or otherwise change the ad's rating.

The link module 34 may inspect one or more links in a document (e.g., automatically in response to identifying the link). For instance, if an image ad document comprises one or more links (e.g., if the image ad displays a URL link on the ad, embeds a hypertext link, or otherwise enables a viewer to select an associated document, e.g., by clicking on a link), the modules 28, 30 may access the link and the linked document. If the modules 28, 30 are unable to access the link or linked document (e.g., if the processor's web browser fails to load the linked document or there is another error), the processor may report a "broken" link (e.g., automatically in response to identifying a "broken" link). For instance, the modules 28, 30 may report this information as rating information to the document rating module 26.

The link information may comprise the link quality rating (e.g., whether the link works or has any problem) as well as the content (e.g., content ratings) of the link and any linked documents (e.g., linked websites). The information may be obtained in any manner of rating documents as described herein. Any link-associated information may be stored in the link database 60 or the characteristics database 52.

Finally, link-related information may be passed to the document rating module 26, e.g., so that the characteristics of any linked documents (or the link itself) may be factored into a document's rating. For instance, an ad may receive a rating of inappropriateness if it links to a site relating to sex, drugs or alcohol or if it links to a document that flashes, contains streaming audio or video, contains infinitely looping animation, involves game playing, etc.

The link module 34 may periodically inspect links in documents, e.g., even after a document has already been rated. For instance, it may check links every month, or every tenth time a user clicks on the link, to ensure that the document has a working link that directs users to an appropriate site.

Other module(s) 42 may accomplish other functions related to rating electronic documents. Several additional server 2 and system 100 functions are described in U.S. patent application Ser. No. 10/742,791 entitled "Method And System For Providing Targeted Graphical Advertisements" filed Dec. 23, 2003; U.S. patent application Ser. No. 10/812,417 (now U.S. Pat. No. 7,533,090) entitled "System and Method for Rating Electronic Documents" filed Mar. 30, 2004; and U.S. patent application Ser. No. 10/841,834 (now U.S. Pat. No. 7,801,738) entitled "System And Method For Rating Documents Comprising An Image," filed May 10, 2004. These applications are incorporated herein by reference in their entirety.

These applications describe other modules 42 that enable processing rating information for documents. For instance, documents may be received and/or generated and passed to evaluators, such as end users, providers, and other entities. The documents may have a feedback link or another mechanism for rating a document, e.g., so that end users can rate a document after receiving the document. The server 2 may receive the ratings and determine content ratings (e.g., sexual content, violent content, and other appropriateness or suitability factors) for each rated document. The ratings may be aggregated and stored in the characteristics rating database 58. Aggregate ratings may indicate ratings in a variety of content areas, such as adult content and violent content. Sensitivity information may be determined for various providers and end users who have specific preferences for the type of content they receive (e.g., a prohibition on pornography). The document rating module 26 may determine whether the document should be approved or rejected based upon the rating or ratings of the document.

Illustrative System Network Environment

Figure 2:
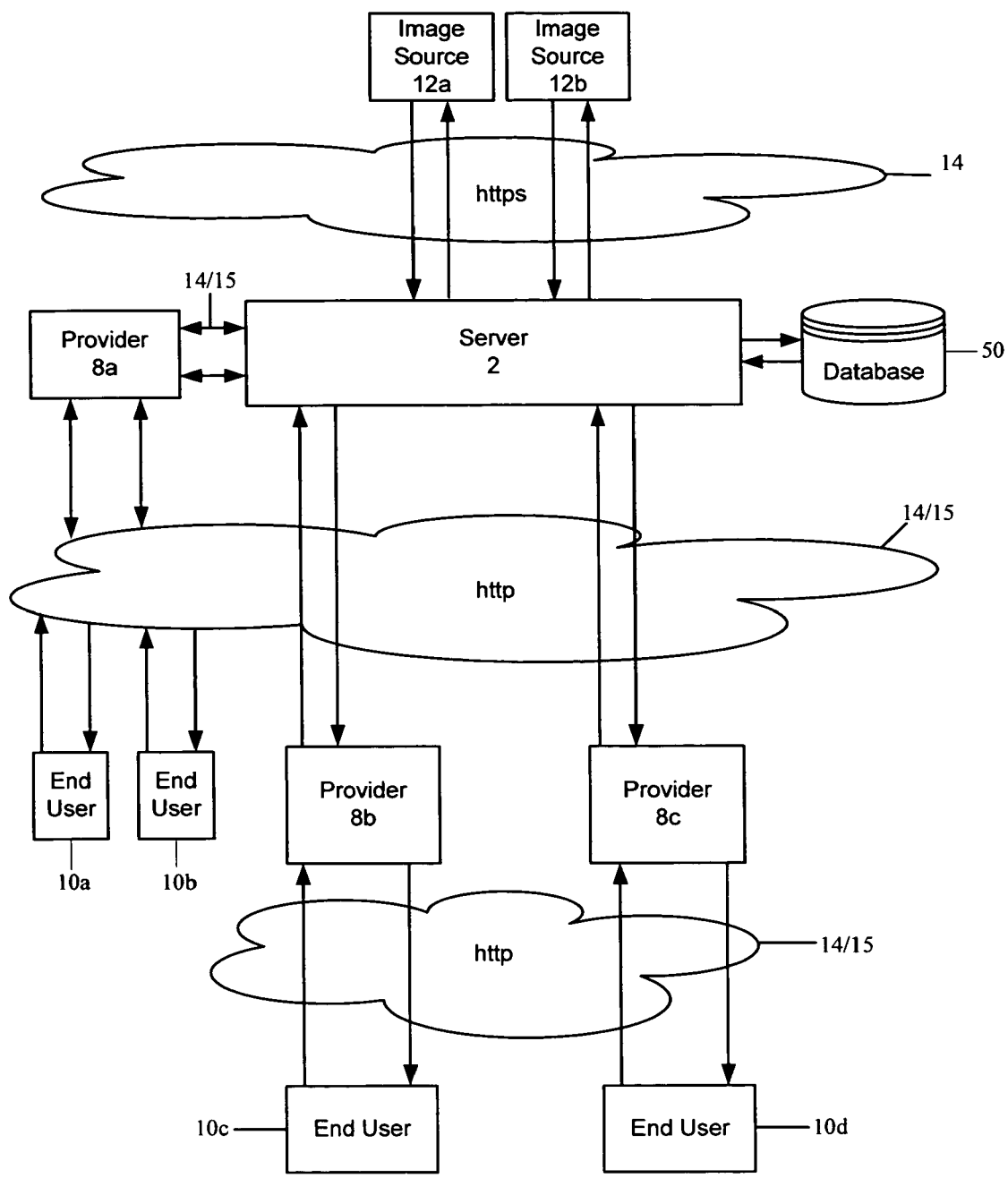
FIG. 2 depicts a networked environment for operation of a system for approving or rejecting an electronic document according to an embodiment of the invention.

FIG. 2 depicts a networked environment for operation of a system for rating, approving or rejecting an electronic document according to an embodiment of the invention. In such an environment, evaluators and providers 8 may connect over a network 14, 15 to a server 2 (e.g., using a secure https connection) to provide documents and rating information to server 2 and to receive documents and rating request information from server 2. The server 2 may store the document, rating, and other information in a database 50. The server 2 may distribute the documents through various forums or feeds, including direct distribution in print media, providing the documents on one or more web sites affiliated with the server 2 and through providers 8. It should be noted that providers may comprise syndication partners of the server 2 (e.g., connected over network 14 or 15 depending on security desired), content systems (e.g., with associated content databases) and search engine systems operated by the server 2 or provider(s) 8.

Through these various forums, the documents provided to the providers 8 may be included in pages (or other documents) displayed to end-users 10 (often called an impression).

Each of server 2, providers 8, and document sources 12 may comprise computerized systems that include one or more of the following systems: a web server 2, a database server 2, proxy server 2, network balancing mechanisms and systems, and various software components that enable the system to operate on the internet or other network type system. Additionally, networks 14 and 15, although depicted as http networks, may comprise other networks such as private lines, intranets, or any other network. In an exemplary embodiment, the connection between a document source 12 such as an advertisement provider and server 2 (and other connections such as between a provider 8 and server 2) may comprise secure network connections to insure that data is not subject to attack or corruption by any hacker or other third party. In addition, whereas two document providers 12 are depicted, it should be appreciated that one or more document providers 12 may be provided in the network. Similarly, although one database 50 is depicted, it should be appreciated that multiple databases may be provided and that such databases may be connected to the server 2 via any type of network connection, including a distributed database server 2 architecture.

Similarly, provider 8a may comprise any number of such systems connected to the server 2 via any type of network, including an http or https network. Content provider 8 may comprise a system such as server 2 that provides functionality for enabling connection over the Internet or other network protocols. End users 10 may comprise any user (such as users connected to the internet) and may comprise computerized systems that enable that connection through any of various types of networks, including through Internet service providers, cable companies, and any other method of accessing data on the Internet. Providers 8 may comprise any system that distributes content such as advertising to end-users 10.

Illustrative Process

Figure 3A:
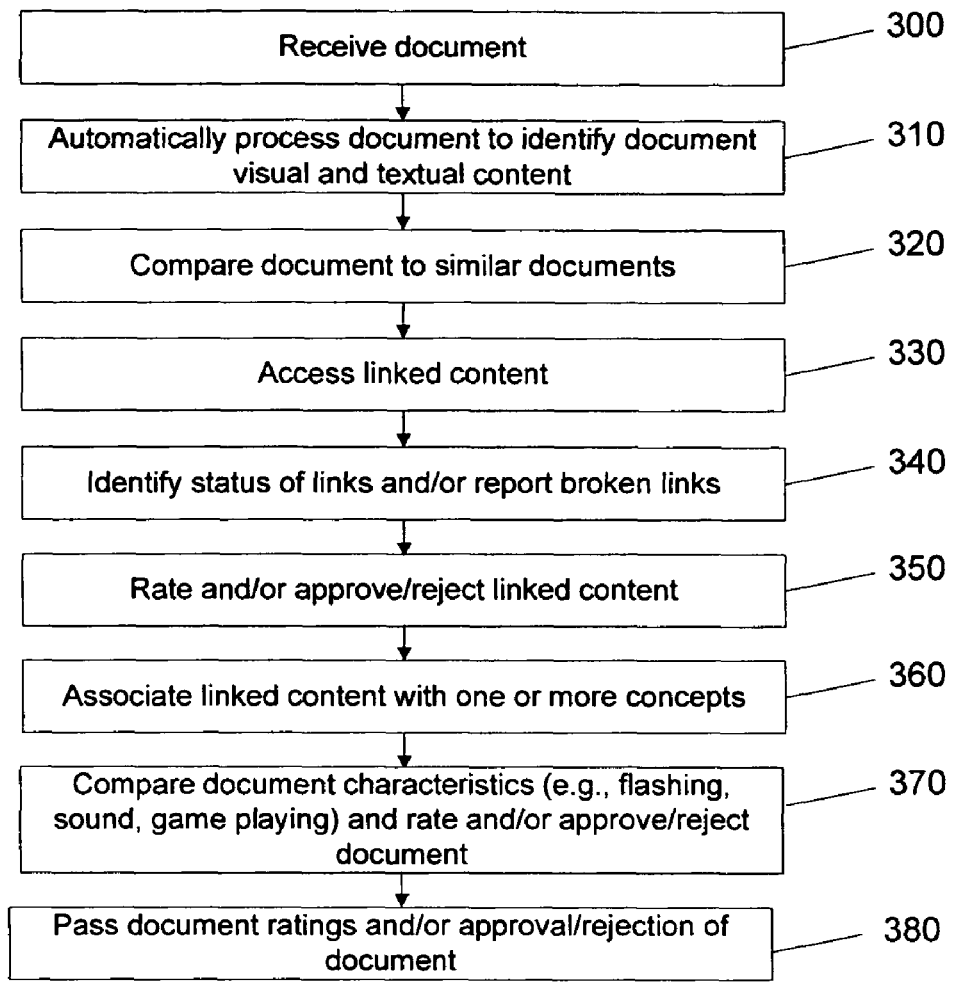
FIG. 3a is a flow chart illustrating an exemplary method for approving or rejecting an electronic document based on the characteristics of the electronic document according to an embodiment of the invention.

FIG. 3a is a flow chart illustrating an exemplary method for rating or approving or rejecting an electronic document according to an embodiment of the invention.

In block 300, a document may be received. For instance, a document source 12a such as an advertisement listings provider may pass an image advertisement to the server for distribution to providers 8 and end users 10. By way of example, the document may be an image ad showing a female model.

In block 310, the document may be processed (e.g., automatically) to identify document visual and textual subject matter (other characteristics such as flashing, involving game playing, and having poor image quality being identified later in block 370). For instance, the image reader module 28 and image file data module 30 may process the document as described herein to identify text and/or images in the document. An image of a female may be identified, as well as text indicating an endorsement of a product and a link to a website (e.g., www.bathingsuits.com), which may be displayed in the ad and/or embedded in the hypertext of the ad.

In block 320, the document may be compared to similar documents. For instance, based on the image processing in block 310, the comparison module 32 may compare the processed image information to image information of other documents and identify similar documents. Concepts such as keywords associated with the similar documents may be identified. For instance, by this comparison the document being evaluated may be associated with nudity, sexuality, violence, profanity, and other subject matter that the Provider 8 may wish to use as a basis for rating or rejecting the document.

In block 330, linked content may be accessed, e.g., by the link module 34. This block 350 is relevant only for documents that comprise at least one link. For instance, the link module 34 may access the www.bathingsuits.com website linked in the ad via a browser.

In block 340, the status of any links may be identified and/or reported. For instance, the link module 34 may identify that the link was functional and that the linked website properly loaded in a browser. If the link did not properly direct the browser to the proper website, or if the website failed to load, the link may be reported broken.

In block 350, linked content may be rated, rejected and/or approved. As in block 310, the content of the link and any linked documents may be rated and/or approved, e.g., by modules 28, 30. The rating/approval information may be associated with the underlying document.

If a link associated with a document is broken, the document may be flagged for review or otherwise disapproved. Similarly, if a link is determined to be associated with inappropriate content (e.g., there is inappropriate content at a linked website), the document may be flagged for review.

In block 360, the linked content may be associated with one or more concepts. The linked content may be associated with concepts such as keywords. The ratings and associations of the underlying document may reflect the ratings and associations of the linked content, as described above.

In block 370, the document may compared to parameters other than visual and textual content (visual and textual subject matter having been assessed in earlier blocks), for instance whether the document is flashing, involves game playing, is of poor image quality) be rated and/or approved. For instance, the image modules 26, 28, 30 may identify that there is a large amount of flesh content in the image of the female, that the document involves random number generation or mouse movement or other action indicating the document involves game playing, that the document flashes or jiggles, or that that document has poor image quality, and accordingly rate the document as undesirable. The ratings may be based on a variety of criteria, such as image content, text, motion, sound, links and linked documents, and other criteria. In some embodiments, the rating/approval information may be determined automatically, e.g., by modules 26, 28, 30. Various techniques may be used to compare ads with specified parameters for rating and/or approval or rejection by the Provider 8. A person skilled in the relevant art will recognize that other languages and techniques can be used for the specification of parameters, comparison of a document to those parameters, and other claim elements set forth herein without parting from the spirit and scope of the invention. For illustrative purposes, exemplary methods of evaluating Flash ads, animated GIF, and static images for ratings are described in the following paragraphs.

Flash ads: The swftools library may be used as it is a robust and complete solution. The information contained in the SWF files may be used to perform the following tasks:

1. Text extraction: Most of the text used in Flash animations is stored under the DefineText tag or its variants. It is possible to extract this text in most cases by examining these tags. This text will be associated with the image and it can be checked against the policies for text in the images like language, trademarks etc.

SWF file supports two kinds of text—Glyph text and Device text. Every Glyph text character is described in terms of the control points of a Quadratic B-Spline which determines the shape of the character. Font for Device text is specified using a standard font name but it also provides Glyph text as a fallback option. Glyph fonts are defined using DefineFont and DefineFont2 tags and Device fonts are defined using DefineFont and DefineFontInfo tags. The DefineFont tag contains a list of the characters used in the animation as Glyphs. No character codes are associated with the Glyphs. Moreover, the characters listed in DefineFont are only a subset of the complete alphabet as it only includes the characters used in the animation and without any additional information, it is not possible to map each shape with its character representation (unless one uses an OCR like technique on the shapes). For the Glyph text, this additional information is completely missing but for Device text, the DefineFontInfo tag contains a mapping from a character shape to its character representation (ASCII or Unicode).

The actual text that is to be displayed is stored in either the DefineText or DefineEditText tag. These tags contain pointers to the character records in the DefineFont tag corresponding to the font it uses. As a result, decoding the text requires decoding both the DefineFont tags and the DefineText tags.

The swftools library allows traversing over the tags in a SWF file. A Provider 8 may first iterate over the tags to associate each font symbol with the corresponding character symbol using the DefineFont and DefineFontInfo tags. Once the fonts are discovered, DefineText and DefineEditText are decoded using the corresponding font information.

2. Checking for disallowed actions: Flash ads which perform certain actions such as streaming audio, streaming video and opening network connections may be specified by the Provider 8 to be annoying. To check for these actions, ActionScript objects may be created and the SWF file can be checked for the presence of these objects.

Flash's security policy ensures that a user 10 is warned if a user 10 is trying to load variables from outside the current domain but silently allows a flash movie to stream data or make web services calls. Even if Flash issues a warning to the user 10 about the movie accessing remote data, it can be annoying to the user 10 due to the warning dialog box opened by the movie. Hence a Provider 8 may wish to check for such methods.

The checks for the disallowed methods is divided into two parts: (1) Check for disallowed objects and (2) Check for disallowed methods. The disallowed objects are the ones which are only used for the purpose of accessing the network or some other resource that is restricted. Examples include classes like Camera, Microphone, NetConnection, SharedObject and XMLSocket. To check for the disallowed objects, a Provider 8 may look for the following ActionScript: action: Push < class name > action: NewObject A Provider 8 could also check for certain network-related calls on other objects. Examples include Sound.loadSound( )

and Movie.loadMovie( ). For these checks a Provider 8 would look for the following ActionScript code:
action: Push < method name > action: CallMethod A Provider 8 could also use control flow and data flow analysis as another technique.

Another possibility for detecting such actions would be to monitor the system calls made by the Flash player while executing the document being in examining. A Provider 8 may check for socket open requests, sound device open requests, etc.

3. Checking for games: Most games involve some kind of mouse motion tracking and random number generation. Mouse coordinates in Flash may be determined through the value of the _xmouse and _ymouse properties of a movie clip. Action script code which tries to do this may be checked. Also, other types of user 10 interaction may be checked. Random numbers in ActionScript are generally generated either through the "ActionRandomNumber" instruction or by using the in-built Math.random( ) library function and the code may be checked for their presence.

Checking for games: Games typically involve mouse tracking and random number generation. In Flash, the position of mouse can be obtained by using the properties _xmouse and _ymouse of a movie clip (often the _root clip). In Flash, a movie clip refers to an animation sequence and such animation sequences can be embedded within the main animation as well. A generic way of tracking the mouse then is to register for a mouse motion event and on such an event, obtain the position of the mouse using the _xmouse and _ymouse properties and take appropriate action. Mouse motion event is supported by movie clip, button and Mouse objects (possibly some more objects as well). There are multiple ways of registering a listener for an event as well.

Many of the Flash games have an object (such as a crosshair) which moves along with the mouse cursor. For such games, a Provider 8 can check for the strings _xmouse and _ymouse in the disassembled file. Ads are generally expected to use the mouse position and it would be uncommon to use "_xmouse" and "_ymouse" as variables or as string constants. Hence, this technique should work reasonably well to detect games. There could be other games where the mouse coordinates are not required but use other mouse actions such as mouse hovering over certain areas.

Random numbers in ActionScript are obtained through the "ActionRandomNumber" instruction or through Math.random( ) call. For the ActionRandomNumber instruction, a Provider 8 may simply check for the presence of the corresponding actionscript tag. For Math.random( ) function, a Provider 8 may check for the following set of instructions:
action: Push "Math" action: GetVariable action: Push "random" action: CallMethod 4. Checking for sound and video: Sound and video are incorporated in a SWF file using the DefineSound and DefineVideoStream tags respectively. The Provider 8 may wish to allow the use of sound in the ads but not allow sound played only as a result of a user 10 action or the Provider 8 may simply check for the presence of sound in the SWF file regardless whether it is being initiated by a user 10 event. This could cause the ad to receive a certain rating, be rejected, or indicate to a human approver, if any, to make more thorough checks of such ads.

5. Checking and fixing clickTAG: If clickTAG is used by the Provider 8, the Provider 8 may want to ensure that the Flash ads have proper support for clickTAG and the user 10 is not redirected to any other URL. This may be accomplished by checking whether there is a "clickTAG" string in the SWF file and that there is no URL present in the file. Provider 8 may also be able to fix the creative by simply replacing "clickTag" with "clickTAG".

To support clickTAG, a Flash ad should have a button with the click action configured to invoke GetURL on the argument supplied through the clickTAG. One simple check would test the presence of the string "clickTAG" and absence of any URL in the code. Another technique would be to check if "clickTAG" is being used as an argument to GetURL2 instruction. A Provider 8 may check for either of the following set of instructions: // 1. getUrl(_root.clickTAG, <target>) 2. getUrl ("clickTAG", <target>) Push <movie clip> Push "clickTAG" GetVariable GetVariable Push "clickTAG" Push <target> GetMember GetUrl2 0 Push <target> GetUrl2 0

The target argument of GetUrl instruction specifies the target window in which the click should be opened. In addition, a Provider 8 may also check for the presence of URLs in the file.

6. Checking and adding clickTarget: Provider 8 may also want to control the window in which the landing page is displayed. This can be achieved by supporting a "clickTarget" argument similar to the clickTAG in the Flash movie. As this is a non-standard feature, Provider 8 may wish to ensure that all the advertisers do not have to change their ad inventory to adhere to this feature and therefore Provider 8 may wish to augment most of the existing Flash files to support this feature.

7. Checking for infinitely looping animations: This check may implemented by executing the SWF file and noting any writes to the display device being performed by the flash player after the maximum allowed animation duration. This technique may be extended to perform checks for networking calls, sound etc. Provider 8 may also simulate user 10 actions like mouse click and check for support for clickTAG.

Animated GIF: ImageMagik library may be used for this purpose. The two most frequently encountered problems with animated GIFs are the flashing and jiggling image ads. Both of these types of ads generally have small delay parameters and that aspect can used to mark some subset of ads as safe.

1. Flashing/Flickering Images: The ads under this category consist of frames with rapidly changing contrast and color scheme. Such ads may be detected by checking for same content in different frames and noting the intensity of color changes between different frames.

Flashing images generally have the same set of objects in all the frames and only the colors (and luminosity) of the objects vary across the frames. Specifying a comparison parameter based on the delays between the frames eliminates the most annoying images. For instance, a comparison parameter of a delay of less than 0.5 seconds between all the frames gives a high probability the image turns out to be an annoying one.

A Provider 8 may also identify similar frames in the animation which are at a distance of one frame from each other. The identification may be based on the observation that the animations which have some kind of flashing effect have similar frames interspersed with frames where either a new object appears in the picture or the color of an object present in the picture changes. Both of these can essentially be considered as sharp changes in the colors between the frames.

Provider 7 may first identify similar frames with a frame in between them and then compare the interspersed frame with one of the similar frames. The contrast change per pixel may be computed, as may the frequency at which this change occurred. The CIE 1976 color-difference formula may be used for measuring the perceived color difference between two images.

The algorithm can be enhanced by taking into account factors such as spatial distribution of colors, color changes along the edges, masking and other idiosyncrasies of the Human Visual System (HVS).

2. Jiggling Images: Jiggling ads are animations with every frame containing the same object but at slightly different positions, giving the impression of a jiggling object. In many of these ads, it might turn out that frames actually use the same image against a constant background but at different page offsets. These ads may be detected by doing a pixel-by-pixel match. If the frames are simply translations of a single image, the Fast Fourier Transform (FFT) coefficients of the frames are same. Another technique is to match the images by aligning the borders of the object contained in the image.

For jiggling animations which are created by changing the page offsets of the same image can be easily detected by comparing the actual frames used in the animation. Other jiggling ads consist of frames which are different images laid out at (0,0) page offset. In some of these ads, the jiggling object is laid against a transparent background. In such cases, each frame may be cropped to remove these transparent pixels and then compare the cropped images.

Techniques based on Fast Fourier Transforms (FFT) also perform well for jiggling animations. The FFT coefficients for all the frames may be computed. Then the sum of absolute difference (SAD) of the coefficients may be computed. For the jiggling images, this difference is closer to zero as the frames mainly involve translation. To offset the effect of the illumination level in the image, the Provider may apply the threshold on SAD relative to the absolute sum of the coefficients of one of the frames. This technique can be made more robust by using Mellin-Fourier Transform.

For detecting strobing and moving objects in general, the Provider 8 may compute motion vectors and check whether there are a group of them pointing in the same direction. The Provider 8 may use a block based motion vector algorithm. To capture features sufficiently well in a block, large blocks of size 12 or more may be used. To avoid the problems of wrong alignment of the blocks, overlapping blocks may be used. Another technique is to use the methods for tracking optical flow in OpenCV library. Another technique would be to trace object movements in Flash through the transformations that are applied to the objects in subsequent frames. If an object is translated or scaled by a significant amount between frames, it would indicate the presence of strobing.

Static Images: Provider 8 may wish to check for poor quality images and layout problems in the static images.

1. Layout Problems: The Provider 8 may extract the border from the image and check whether the border has a sharp edge boundary or occupies a large part of the image. The edges of the bounding box of the image may first be identified by scanning along each edge of the image and finding the first line parallel to that edge which does not match it. These lines constitute the bounding box of the image. Then a check for whether the edges of the bounding box correspond to edges in the original image may be made by computing the gradient along the edges. If the image has edges matching the bounding box or if the bounding box is very small compared to the original image, the image may be rated as having layout problems.

2. Image Quality: A no-reference based quality assessment may be used. In such a type of assessment, there is no "ideal" image to compare the quality of the given image. Under such exemplary approach, the Provider 8 may determine some image quality metrics (IQMs), such as the and evaluate the given image on these IQMs. Also, OCR techniques may be employed to extract text from images. In addition to the text extraction, it may also be used to assess image quality. For ads which are supposed to contain text, if the OCR cannot decipher any meaningful text from the images, the document may be rated and/or rejected as having a low quality image.

A Provider 8 may also compare parameters specified such to detect images intended to trick a user 10. Some ads may contain text boxes, drop downs, and buttons which are not functional and are just present as images. A Provider 8 could use edge/corner detection techniques for detecting the presence of these objects in images.

If a document is flagged or otherwise not approved based on its characteristics (e.g., if the ad contains undesirable actions such as flashing or jiggling), the document may be passed to one or more evaluators for human review. The document may be later approved after a number of human reviewers approve the document.

In block 380, the document, ratings, and approval or rejection status is passed, e.g., to the Provider 8.

It will be appreciated to those skilled in the art that the acts described may be performed by hardware, software, or a combination thereof, with or without human intervention, as may be embodied in one or more computing systems such as a server 2 system coupled to entities such as providers, evaluators, databases, and end users 10. Further, it should be appreciated that not all of the blocks must be accomplished. For instance, in one embodiment, the method may begin at block 310 and end at block 370. Also, it is not necessary that the action(s) of each block be performed in the order shown in FIG. 3. Any order of performance may be considered.

Figure 3B:
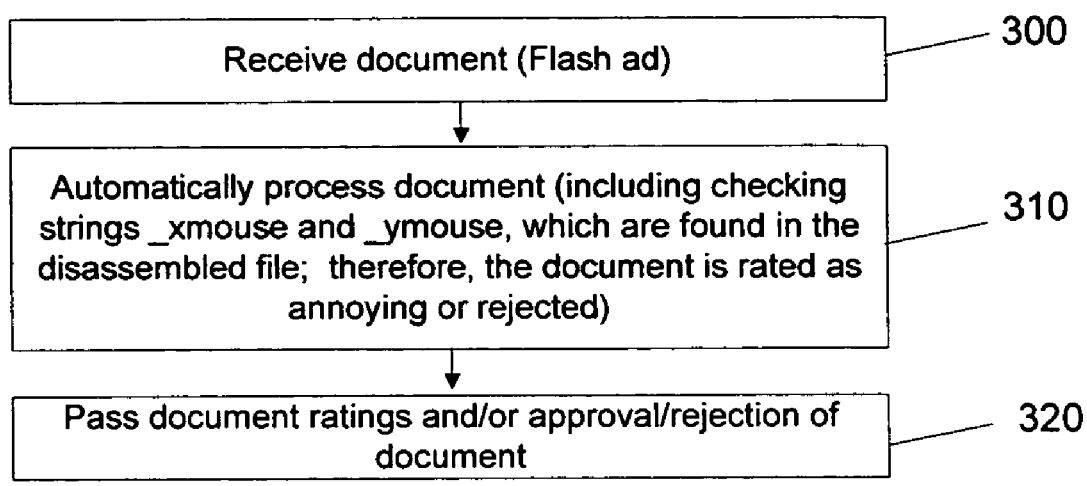
FIG. 3b is a flow chart illustrating an exemplary method for approving or rejecting a Flash ad based on the characteristics of the ad according to an embodiment of the invention.

FIG. 3b is a flow chart illustrating an exemplary method for rating or approving or rejecting a Flash ad according to an embodiment of the invention.

In block 300, a Flash ad document may be received. By way of example, the Flash ad in this example is a game where the user 10 must use a mouse to play the game.

In block 310, the document may be processed (e.g., automatically). The strings _xmouse and _ymouse are checked for in the disassembled file. The strings are found and the document is rated as an annoying ad or rejected.

In block 320, the document, rating, and/or rejection status is passed, e.g., to the Provider 8.

Figure 3C:
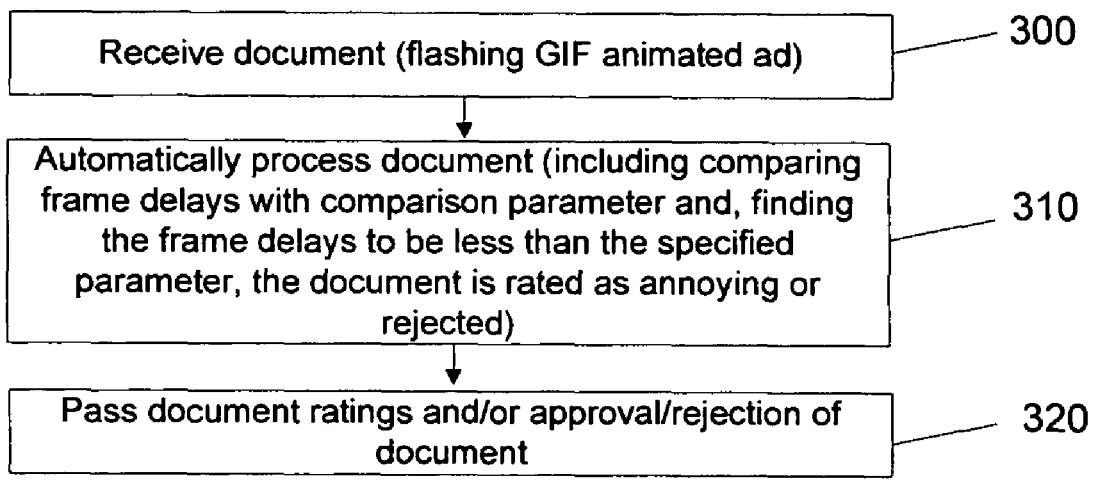
FIG. 3c is a flow chart illustrating an exemplary method for approving or rejecting an animated GIF document based on the characteristics of the electronic document according to an embodiment of the invention.

FIG. 3c is a flow chart illustrating an exemplary method for approving or rejecting a flashing animated GIF document according to an embodiment of the invention.

In block 300, an animated GIF document may be received. By way of example, the animated GIF document is a flashing animation.

In block 310, the document may be processed (e.g., automatically). The delays between the frames is checked and found to be 0.2 seconds between all the frames. This determined delay is then compared against a comparison parameter of a delay of 0.5 seconds. Because the determined delay is found to be less than the comparison parameter, the document is found to be a flashing ad and is rated as a flashing ad or rejected.

In block 320, the document, rating, and/or rejection status is passed, e.g., to the Provider 8.

Figure 3D:
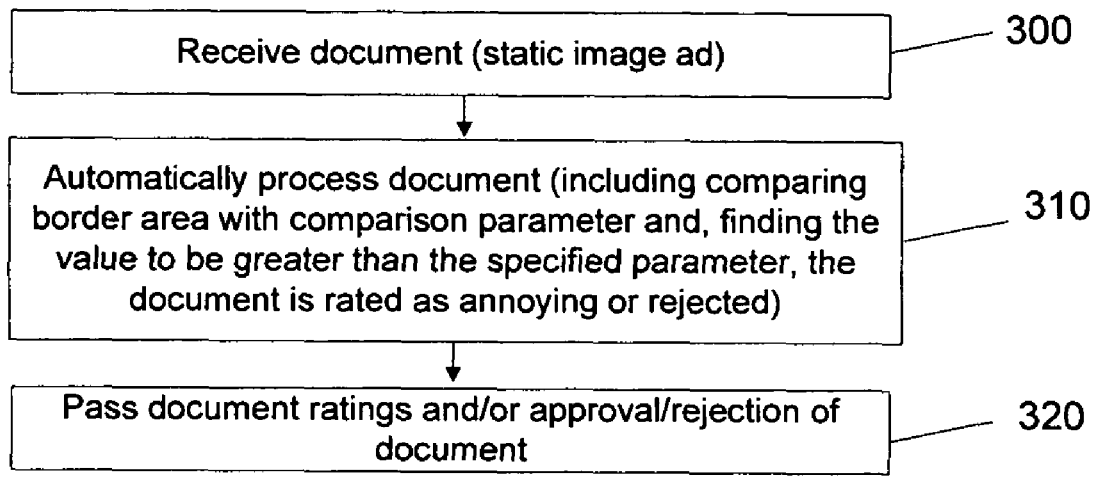
FIG. 3d is a flow chart illustrating an exemplary method for approving or rejecting a static image ad based on the characteristics of the ad according to an embodiment of the invention.

FIG. 3d is a flow chart illustrating an exemplary method for rating or approving or rejecting a static image document according to an embodiment of the invention.

In block 300, a static image may be received. By way of example, the static image is an image of a cola can with a surrounding border.

In block 310, the document may be processed (e.g., automatically). The border is extracted from the image and the percentage of the image occupied by the border is determined. It is found that the border occupies 50% of the image.

The 50% value is compared against the comparison parameter of 30%. Because the determined value (50%) is greater than the comparison parameter (30%), the document is found to have a layout problem and the document is rated as an annoying ad or rejected.

In block 320, the document, rating, and/or rejection status is passed, e.g., to the Provider 8.

Illustrative User Interface and Results

Figure 4A:
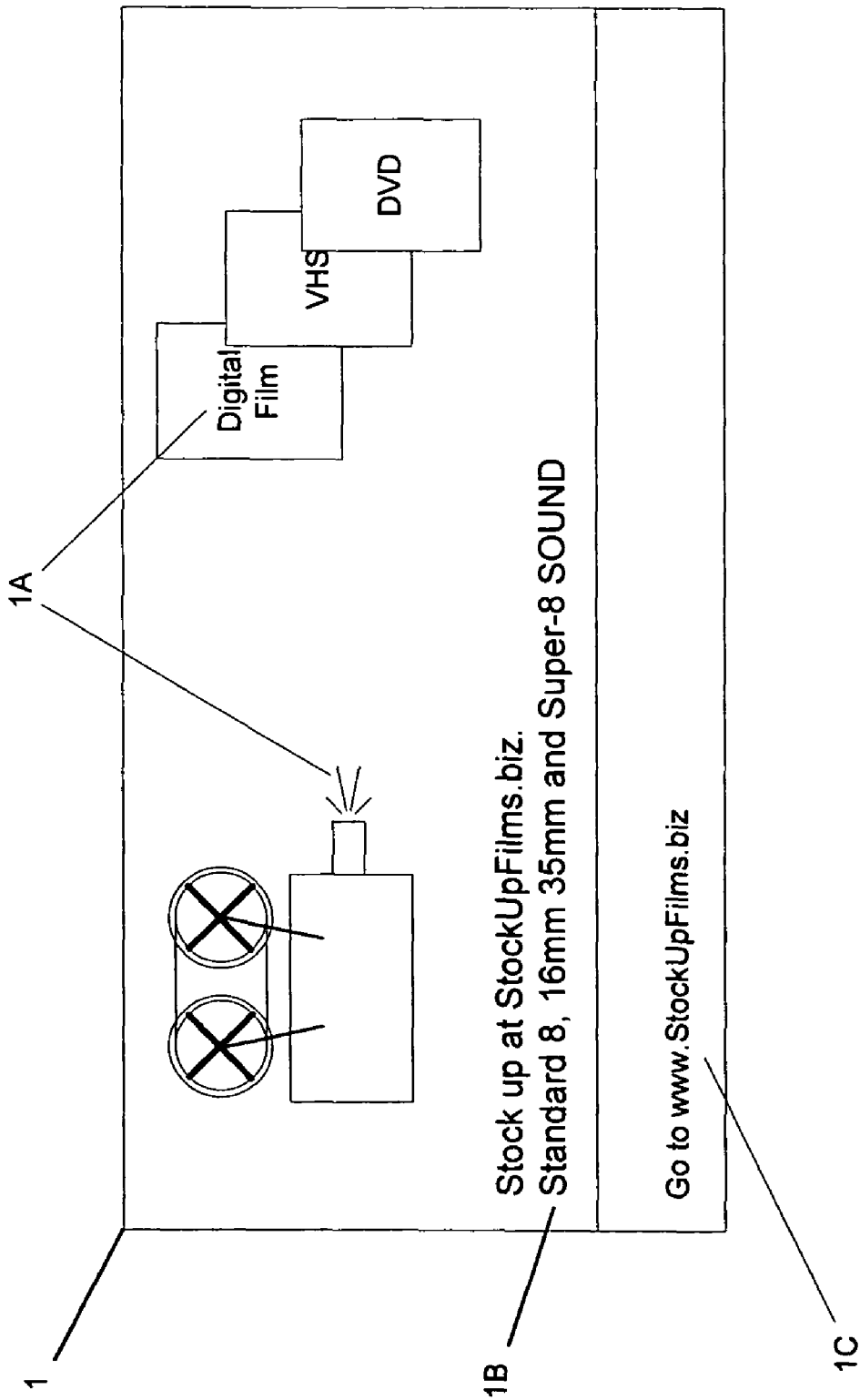
FIG. 4a depicts an exemplary document according to an embodiment of the invention.

FIG. 4a depicts an exemplary image advertisement document 1 according to an embodiment of the invention. The image ad 1 may comprise a banner ad, another ad that can be displayed on a web page, or another graphical advertisement that can be displayed via an electronic means. The image ad 1 shows specific images 1A, ad text 1B, and one or more links 1C. The specific images 1A comprise a film projector and images of a DVD, VHS, and digital film container. The text 1B comprises an advertisement message, e.g., a description of a product or service, a suggestion to a potential customer, and/or other advertising text. The link 1C may comprise a link to another document, such as the advertiser's web page URL (or portion thereof). For instance, the link 1C may comprise an embedded hypertext link, and the embedded link may be associated with the link 1C displayed in the image of the document 1. In some embodiments, selecting (e.g., clicking on) the displayed URL or other link while viewing the document 1 (e.g., in a web browser) may direct the viewer's mechanism for viewing documents (e.g., web browser) to the content associated with the link (e.g., the advertiser's web page).

The document may have various types of content. For instance, the document may have words, images, sounds, and other information, as well as functions or programs, which may dynamically produce words, images, sounds, and other information. Each document may have different amounts of various types of content, such as sexual content, violent content, drug or alcohol-related content, financial content, adult-related content, child-related content, and other content.

The document 1 may explicitly display the link 1C. Also, the link 1C may be embedded in the document (e.g., in the programming of the document) or a portion thereof such that the link 1C is not visible. Here, selecting (e.g., clicking on) the document 1, an image 1A, text 1B, or another portion of the document may direct a user's 10 document viewing mechanism to the linked document(s). The document 1 itself, images 1A, and text 1C may also comprise one or more links 1C. For instance, an ad that advertises a plurality of products may comprise a link for each product, wherein selecting (e.g., clicking on) an image 1A, icon 1A, or text 1B relating to a specific product may direct a web browser (or other document viewing mechanism) to a page at a merchant's site associated with the specific product (or to another document). The document 1 may rapidly change colors, involve streaming audio or video not initiated by the user 10, or other actions that may be considered by the Provider 8 to be annoying or otherwise undesirable.

The document may have various types of content. For instance, the document may have words, images, sounds, and other information, as well as functions or programs, which may dynamically produce words, images, sounds, and other information. Each document may have different amounts of various types of content, such as sexual content, violent content, drug or alcohol-related content, financial content, adult-related content, child-related content, and other content.

Figure 4B:
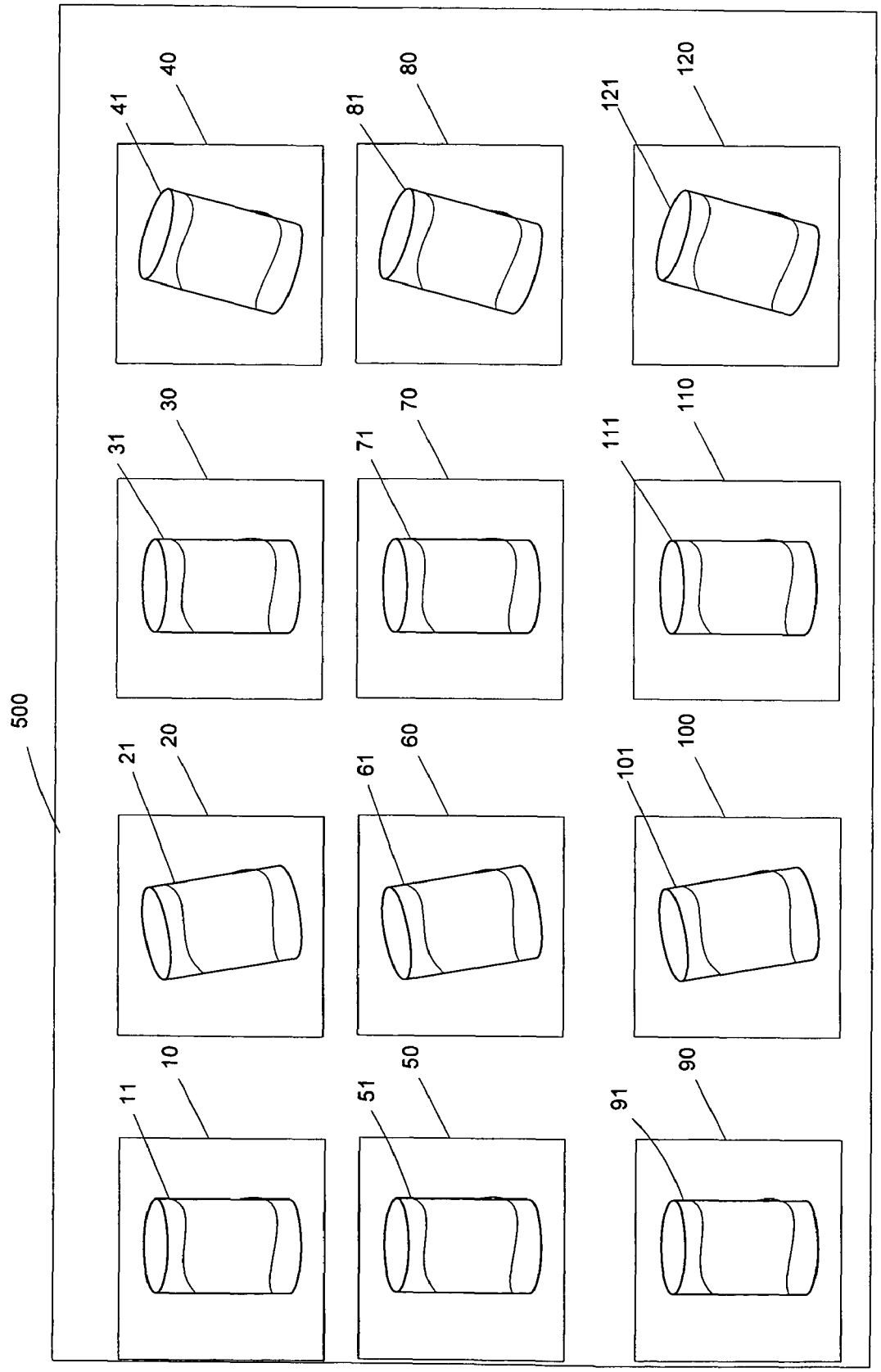
FIG. 4b depicts an exemplary document with a jiggling ad according to an embodiment of the invention.

FIG. 4b depicts several sequential frames 10, 20, 30, 40, 50, 60, 70, 80, 90, 110, 120 of an exemplary video advertisement document 500 (which is a jiggling ad) according to an embodiment of the invention. The frames 10, 20, 30, 40, 50, 60, 70, 80, 90, 110, 120 depict a can of cola 11, 21, 31, 41, 51, 61, 71, 81, 91, 111, 121 that is translated at different positions within the frames 10, 20, 30, 40, 50, 60, 70, 80, 90, 110, 120 so that when the frames are displayed sequentially, the can of cola 11, 21, 31, 41, 51, 61, 71, 81, 91, 111, 121 appears to jiggle in the video advertisement document 500. Frame 10 depicts a can of cola 11 standing upright, frame 20 depicts a can of cola 21 standing tilted slightly to the right, frame 30 depicts a can of cola 31 standing upright again, frame 40 depicts a can of cola 41 standing tilted slightly to the left, and the sequence begins again at frame 50. The invention would detect this ad as annoying and in one embodiment flag the document such to inform the Provider 8 that the ad needs to be examined. In another embodiment the invention would automatically reject the ad.

Figure 4C:
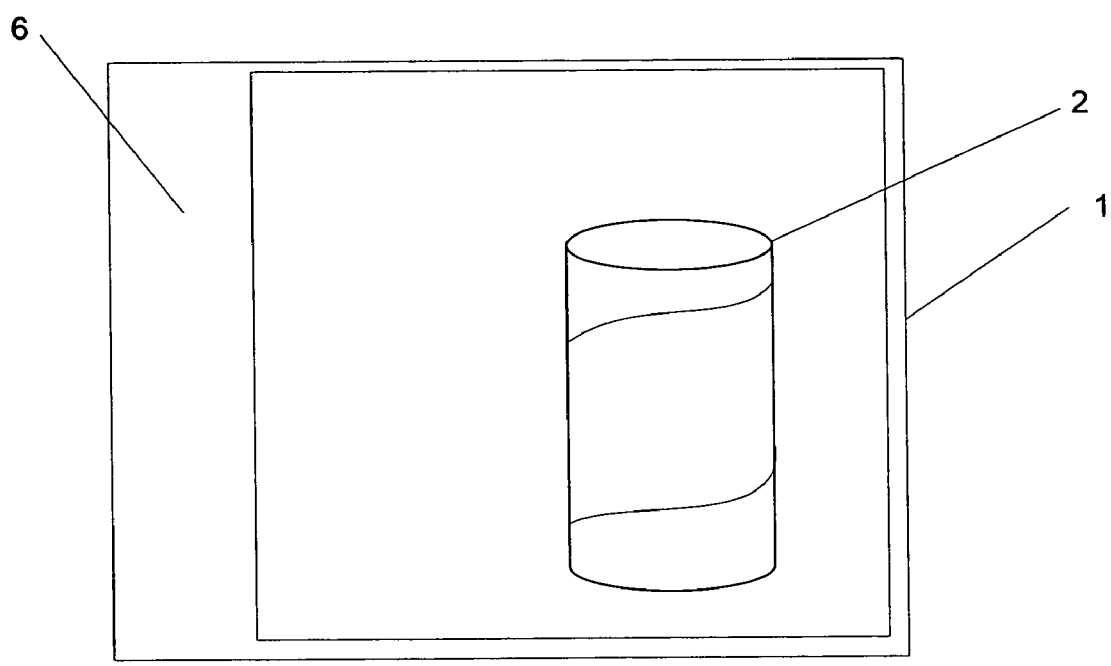
FIG. 4c depicts an exemplary document with a layout problem according to an embodiment of the invention.

FIG. 4c depicts an exemplary image advertisement document 1 (which is a static ad) according to an embodiment of the invention. The image ad 1 shows an image of a cola can 2 and a border 6 around the image. The image ad 1 has poor layout; specifically, the sizing of the ad results in a large area being occupied by the border 6 of the ad 1. An embodiment of the invention would detect this layout problem and inform the Provider 8 that the ad needs to be examined. In another embodiment the invention would automatically reject the ad.

Figure 5:
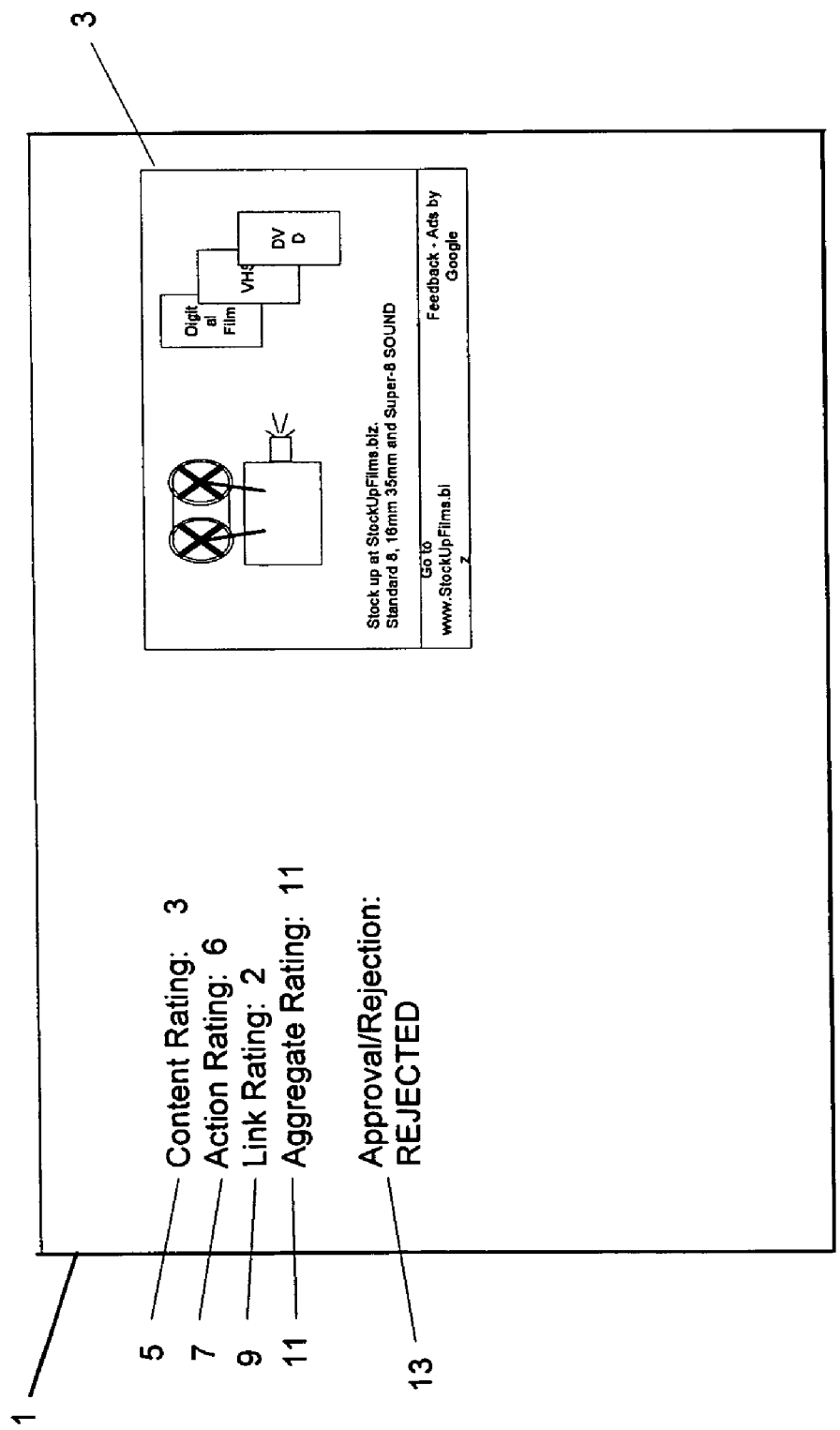
FIG. 5 depicts an exemplary document providing rating information according to an embodiment of the invention.

FIG. 5 depicts an exemplary document 1 according to an embodiment of the invention. FIG. 5 depicts a document providing on a monitor, to the Provider 8, rating and approval/rejection information regarding an ad. The document ad 3 being rated and approved or rejected is provided to the Provider 8. Ratings provided include a content rating 5, action rating 7, link rating 9, aggregate rating 11, and approval/rejection status 13.

It should be understood that the server, processors, and modules described herein may perform their functions (e.g., comparing a document to specified parameters and/or determining rating information) automatically or via an automated system. As used herein, the term "automatically" refers to an action being performed by any machine-executable process, e.g., a process that does not require human intervention or input.

The embodiments of the present inventions are not to be limited in scope by the specific embodiments described herein. For example, although many of the embodiments disclosed herein have been described with reference to image ads, the principles herein are equally applicable to other documents, such as websites. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

What is claimed is:

1. A computer-implemented method of approving a document, the method comprising:

analyzing content of a first document to identify one or more first portions, wherein the first portions are visual, textual, or audio portions;

identifying one or more second documents that are similar to the first document, wherein the one or more second documents have second portions that are visual, textual, or audio portions;

based upon computer code that describes the first portions and the second portions, determining whether any of the first portions are substantially identical to the second portions that have been predetermined to be unacceptable; and approving the first document only if none of the first portions are substantially identical to the second portions that have been predetermined to be unacceptable.

2. The method of claim 1 further comprising making an approval or disapproval determination based on determining whether the document contains a portion that is substantially identical to an unacceptable segment.

3. The method of claim 1, wherein the code determining operation comprises determining whether the document contains delay parameters of lower magnitude than a delay parameter predetermined to be acceptable.

4. The method of claim 1, wherein the code determining operation comprises determining whether the document contains computer code that results in the downloading of one or more video documents without initiation by the user.

5. The method of claim 1, wherein the code determining operation comprises determining whether the document comprises computer code that downloads one or more audio documents without initiation by the user.

6. The method of claim 1, wherein the code determining operation comprises determining whether the document comprises computer code that downloads one or more video and one or more audio documents without initiation by the user.

7. The method of claim 1, wherein the code determining operation comprises determining whether the document comprises computer code that obtains data from sources other than the document itself.

8. The method of claim 1, wherein the code determining operation comprises determining whether the document comprises computer code that opens network connections.

9. The method of claim 1, wherein the determining operation comprises determining whether the document comprises computer code that loops greater than a number previously designated for comparison.

10. The method of claim 1, wherein the code determining operation comprises determining whether the document comprises computer code that includes simulated random number generation.

11. The method of claim 1, wherein the code determining operation comprises determining whether the document comprises computer code that calls hardware that is substantially identical to one or more types of hardware that has been predetermined to be unacceptable.

12. The method of claim 11, wherein the one or more types of hardware comprises a computer mouse.

13. The method of claim 11, wherein the one or more types of hardware comprises a game controller.

14. The method of claim 1, further comprising comparing an image of the document with one or more image quality values that have been predetermined to be acceptable.

15. The method of claim 14, wherein the one or more quality parameters comprises a degree of definition of a border boundary of a visual content of the document.

16. The method of claim 14, wherein the one or more quality parameters comprises an extent that a border boundary of a visual content of the document occupies a visual content of the document 17. The method of claim 1, further comprising comparing a frame of an image of the document change contrast rate with a change contrast rate that has been predetermined to be acceptable.

18. The method of claim 1, further comprising comparing a color change rate of a frame of an image with a color change rate that has been predetermined to be acceptable.

19. The method of claim 1, further comprising comparing a rate at which an image of a document translates with a rate of translation that has been predetermined to be acceptable.

20. A computerized system for approving a document, comprising:

one or more computers for implementing the steps for:

analyzing content of a first document to identify one or more first portions, wherein the first portions are visual, textual, or audio portions;

identifying one or more second documents that are similar to the first document, wherein the one or more second documents have second portions that are visual, textual, or audio portions;

based upon computer code that describes the first portions and the second portions, determining whether any of the first portions are substantially identical to the second portions that have been predetermined to be unacceptable; and approving the first document only if none of the first portions are substantially identical to the second portions that have been predetermined to be unacceptable.

* * * * *